United States Patent [19]

Frampton

[11] Patent Number: 4,672,783
[45] Date of Patent: Jun. 16, 1987

[54] FRAME FOR A VEHICLE SUN ROOF

[75] Inventor: Jeffery A. Frampton, Begnins, Switzerland

[73] Assignee: Idex Limited (Jersey), St. Helier, United Kingdom

[21] Appl. No.: 787,323

[22] Filed: Oct. 15, 1985

[30] Foreign Application Priority Data

Oct. 12, 1984 [GB] United Kingdom ............... 8425774

[51] Int. Cl.⁴ .............................................. E04C 3/10
[52] U.S. Cl. ..................................... 52/224; 296/216; 296/223
[58] Field of Search ................ 52/474, 475, 476, 222, 52/224, 225; 296/216, 223, 218; 49/504, 505

[56] References Cited

U.S. PATENT DOCUMENTS

| | | | |
|---|---|---|---|
| 850,048 | 4/1907 | Playford | 52/224 |
| 877,534 | 1/1908 | Vanvactor | 52/224 X |
| 3,137,491 | 6/1964 | Coenen | 296/223 X |
| 3,874,722 | 4/1975 | Pickles | 296/223 |
| 4,039,222 | 8/1977 | Wolf et al. | 296/223 X |
| 4,104,825 | 8/1978 | Hosmer | 296/218 X |
| 4,207,716 | 6/1980 | Moldrup | 52/224 |
| 4,260,189 | 4/1981 | Periou et al. | 296/223 |
| 4,531,777 | 7/1985 | Bienert et al. | 296/223 |

Primary Examiner—William F. Pate, III
Assistant Examiner—Creighton Smith
Attorney, Agent, or Firm—Webb, Burden, Robinson & Webb

[57] ABSTRACT

A frame surround for an aperture in a panel e.g. for a vehicle sunroof, capable of easy and rapid assembly, has a first (outer) component 1 surrounding the outer margin of, and entering the aperture to present a peripheral outwardly open groove for accommodating a second (inner) component 2. The second component is surrounded by a cable 3 tightenable by mechanism 4, and is formed as a number of polymer parts 5a, 5b, 5c to give a structure distortable inwardly as the cable is tightened to enter the outer component groove and clamp the margin of the panel around the aperture between the two components. The groove-entering clamping portions of component 2 are toothed to minimize friction. The cable 3 runs in a restraining groove in the outer face of component 2. The restraining groove does not lie in one plane, whereby tightening the cable tends to minimize cable length and thus distorts the structure by a predetermined amount, to correspond to panel curvature.

9 Claims, 8 Drawing Figures

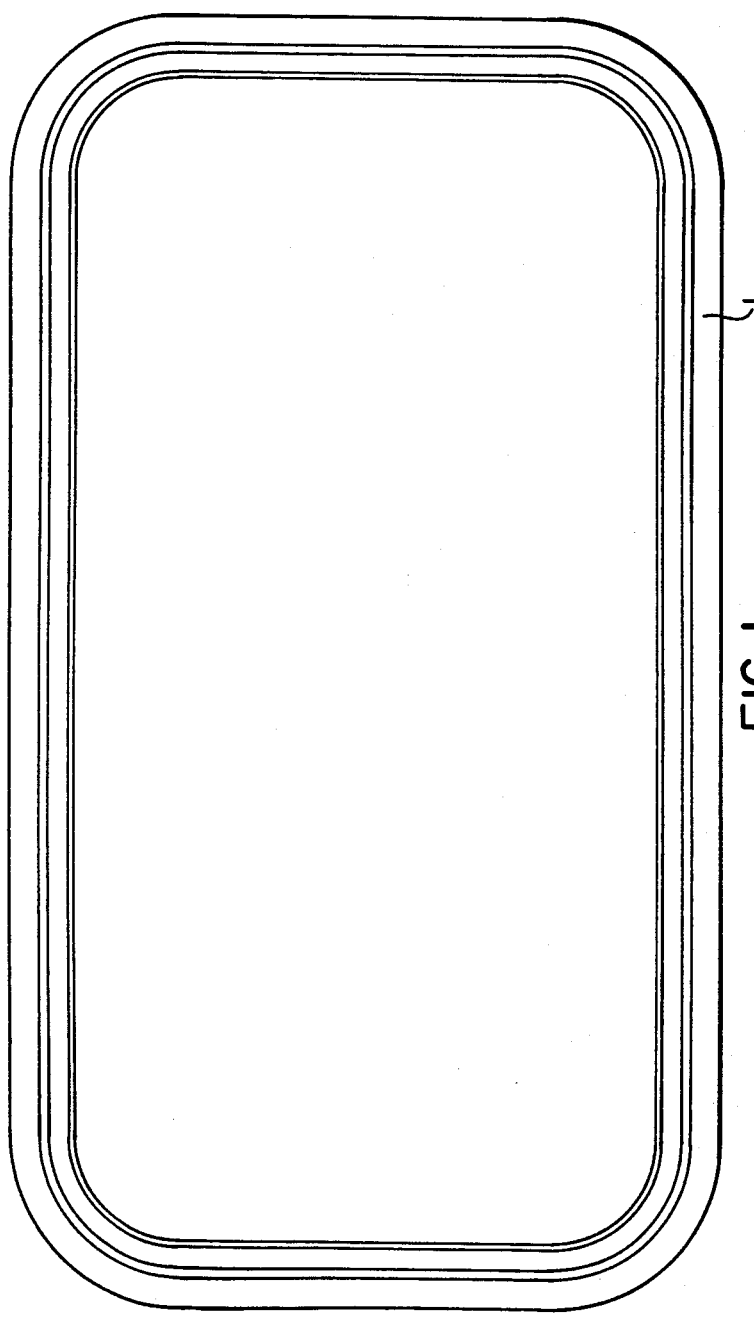
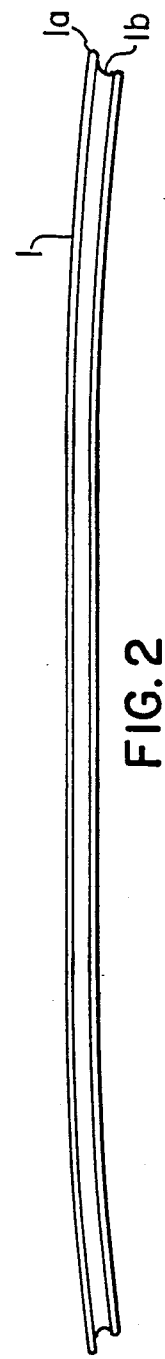
FIG. 1
FIG. 2

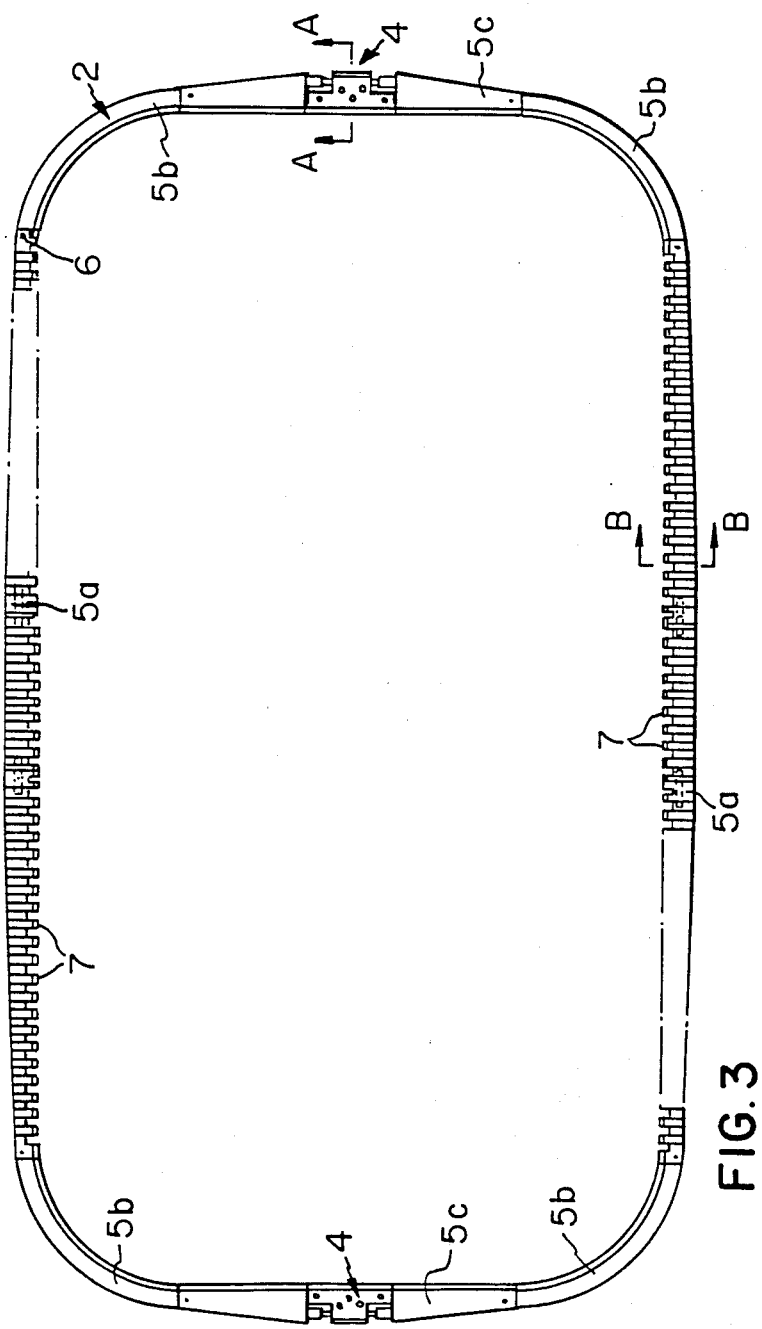
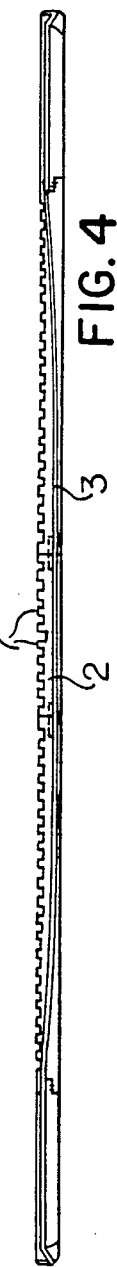

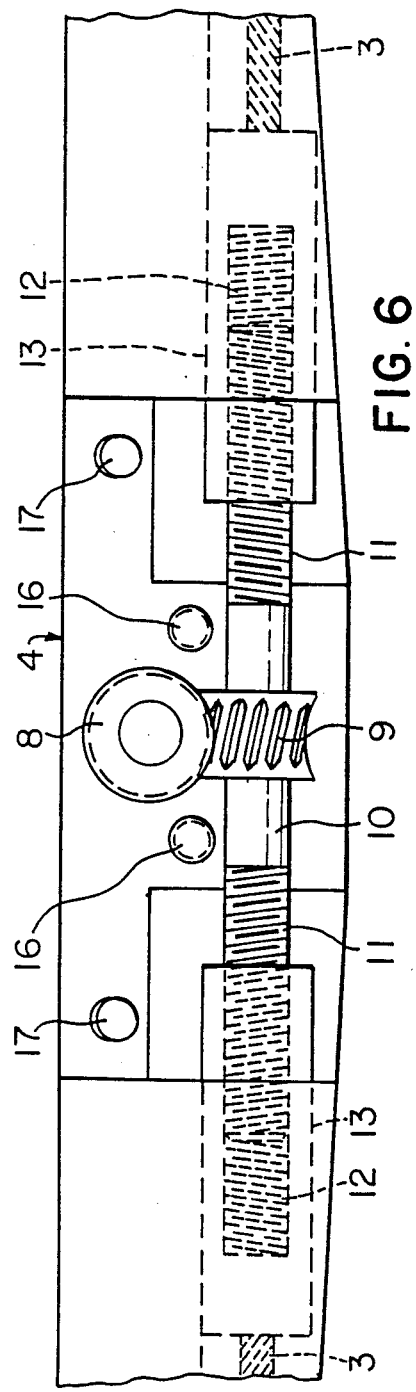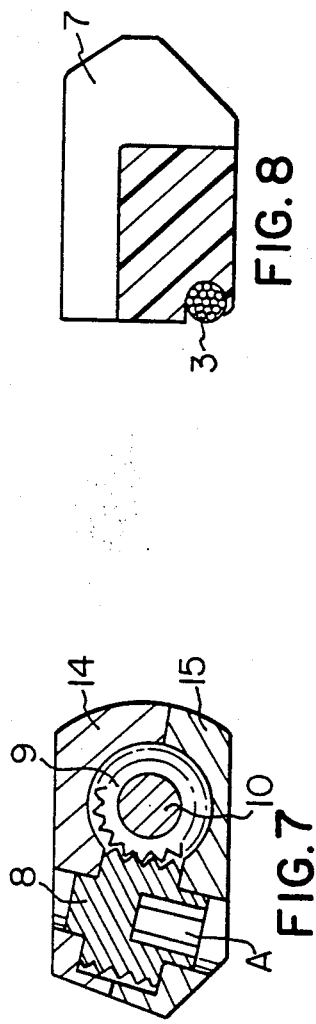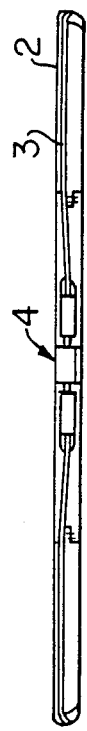

FRAME FOR A VEHICLE SUN ROOF

This invention relates to a frame fastenable to surround a similarly shaped aperture in a panel.

It can for example be used in building constructions, for permanent buildings or for temporary buildings, such as exhibition buildings, site building or emergency buildings, to give a framed aperture for window panels, doors, hatches, flaps and like planar members of all types. It can also be used in vehicular constructions, whether marine, surface or air vehicles, e.g. for ventilator panels, visors, and window or access openings as discussed above. A particular utility is however in road vehicles, in which components need to be fitted around an aperture usually in a metal panel. By way of example only, therefore, and in the understanding that the description given is applicable to the other locations and uses as described above (unless otherwise repugnant to its context) the invention will be described particularly with reference to its use as a frame surrounding and supporting a motor-vehicle sun roof.

A frame for a vehicle sun roof is suitably formed of two components, one fitted from above the roof and thus from outside the vehicle and other fitted from below the roof and thus from inside the vehicle, after cutting out a suitably sized opening in the vehicle roof. The frame component fitted from within the vehicle is received by the other frame component, the frame components essentially being in contact with each other along their peripheries, to hold a metal roof panel between them.

The two components must then be secured together, and this is usually done by a series of screws, bolts, rivets, pins or the like passing through the two components. However, this manner of securing the two components together is a laborious process involving not only many individual fastenings but also ensuring that receiving holes are pre-formed in the two components are properly aligned.

The present invention therefore aims to provide a simpler and improved manner of fastening together two frame components as, by way of example, suitable for assembly of a vehicle sun roof frame, but not limited to this application.

In one aspect the invention provides a frame to grip the edges of and thereby fixedly surround an aperture in a panel, which comprises: a first component for location around the aperture at one face of the panel; a second inwardly deformable component for location around the aperture at the other face of the panel and having an edge face positively curved at all points around its circuit; a tensioning means around the edge face; and means for tightening the tensioning means so as to deform the second component inwardly: the first and second components being complementarily formed so that on such deformation they both grip one another within the aperture and grip the panel around the aperture.

Generally speaking it is envisaged that the complementary formation of the two frame components will be achieved by (a) shaping the first component with a top face to overlie the said one face of the panel, and a somewhat inclined inner face, spaced below the top face, located within the aperture and (b) shaping the second component with a similarly inclined under face so that upon tensioning and distortion of the component this under face can ride up the first component inner face to clamp the components together with the aperture-surrounding edge of the panel trapped between them.

By "positively curved" we mean that the shape of the edge face is such that a tight loop of cable (in one or more positions) contacts it with a positive inwardly deforming force at all points around its periphery. Obviously, the simplest such shape is circular, a shape which could be used directly e.g. for apertures on marine craft or which could be disguised by suitable internal peripheral shaping of the outer (first) component. An ellipse would be more useful, and in practice we prefer a shape generally resembling a rectangle with radiused corners and outwardly bowed edges. The exact amount of radiusing and bowing can vary, depending on the construction, amount of tension exertable, and proposed end use of the frame. Effects of such variation are easily calculated, or determined by trial and error or computer simulation by a skilled engineer.

In usual practice, considerable tension e.g. up to 20 tons or more is to be exerted by the tensioning means. Some form of strong cable is preferred, usually held in a restraining groove against undesired lateral slippage. For temporary or exhibition buildings, high tensile polymer may suffice as the cable material, but usually helically-wound steel cable will be used.

The tightening means are therefore usually some form of high-mechanical-advantage wind-up means. The skilled engineer will know of many such mechanisms. We have used one or more (usually two) Allen keys upon co-operating worm gears formed at the end of cable portions, but do not intend our invention to be limited by this expedient.

The first component is normally the outer component and is usually made of metal. The second component, normally inner, is usually made of a polymer material, since it needs to be distortable and capable of being pushed into engagement with the first component. However, provided it was chosen and shaped for deformability, there is no reason why metal should not be used for the second component, or in suitable instances why a sufficiently strong polymer should not be used for the first component.

We have found, however, that certain advantages are present using a polymer as the material of the second or inner component. Thus, it can readily be moulded in a number of subunits joined end to end, this multipart construction still constituting a "circumferential wedge" as required by the invention. Also, that part of the second component which is forced into clamping contact with the first component is preferably toothed or serrated, to save material and diminish friction. Together, these two expedients ensure that no polymer moulding utilised in preferred practice of the invention is so large as to distort on cooling out of its mould.

Hitherto, the invention has been discussed in relation to the fixing of frames around apertures in flat panels. However, it is also possible in accordance with the invention to fix frames around apertures in panels which are monoaxially or biaxially curved, thus facilitating its use in road-vehicle or marine craft construction. Obviously, frame components can be custom-shaped ab initio, but we have discovered that cheaper, monoplanar, components can be deformed into the necessary shape.

As already indicated above, the tensioning means may be a single or multipart cable held in a groove around the second component edge face. We further envisage that such a groove does not lie in one plane but varies therefrom so that on tightening the tensioning means the assembled frame is distorted as the cable attempts to occupy a shortest path in a single plane. For example, the cable or the like can be held in a groove around and in the edges of a generally rectangular frame second component so that it is nearer the first component at the (radiused) corners than at the middle of the (bowed) sides. Upon tightening the parts together, the corners are pulled down in relation to the sides, so that for example the assembled frame corresponds with the biaxial curvature of the vehicle roof and can thus serve as the support frame for known sun roof seals, hinges, and latches.

It will be apparent from the foregoing that the invention not only extends to the assembled frame, but (a) to such a frame when further provided with glazing and/or closure members (b) to the methods of assembling such a frame and (c) to the unassembled kit of parts from which such a frame can be assembled or into which it can be disassembled. More especially, the invention extends to such assembled frames when constituting, or comprising part of, the sun roof or like construction whether factory installed or later installed, of a motor vehicle, and to the associated methods and kits of parts.

The invention will be further described, by way of example only, and without limitation upon its many other forms and utilities with reference to the accompanying drawings, in which:

FIG. 1 is a plan view of the one component of one embodiment of a vehicle sun roof frame according to the invention;

FIG. 2 is a side view of the sun roof frame component shown in FIG. 1;

FIG. 3 is a plan view of the other component of the sun roof frame;

FIG. 4 is a side view of the sun roof frame component shown in FIG. 3, and illustrating a part of the path of the tightening cable for tightening the two frame components together;

FIG. 5 is an end view of the sun roof frame component shown in FIG. 3, and illustrating another part of the path of the tightening cable;

FIG. 6 is an enlarged plan view of a part of the other component of the sun roof frame, with the cover plate of the cable tightening mechanism removed so as to illustrate in detail the manner of tightening the two frame components together;

FIG. 7 is a cross-section taken along the line A—A in FIG. 3, and illustrating a part of the cable tightening mechanism; and FIG. 8 is a cross-section taken along the line B—B in FIG. 3.

The vehicle sun roof frame shown in the drawings essentially comprises a first, metal, component 1 and a second, plastics, component 2, which are in use assembled together and tensioned or tightened by means of a metal cable 3, the cable being tightened by means of a mechanism 4.

The metal component 1 is shaped as shown in FIGS. 1 and 2 of the drawings, and is in use fitted from above into and around an aperture cut in a vehicle roof panel for the purpose of fitting a sun roof on the vehicle roof with the edge or flange portion 1a of the component 1 overlying the upper, outside, perimeter of the cut-out portion of the vehicle roof. The frame component 1 has a perimeter 1b of channel-shaped cross-section, for receiving the frame component 2. FIG. 2 shows a slight bowing of the frame component, as achieved in actual use, by a method discussed below.

The plastics (second) frame component 2 is shaped as shown in FIGS. 3 to 5, being rectangular with radiused corners, and outwardly bowed sides and is in use fitted into and around the aperture, but from below, i.e. from within the vehicle itself. Thus, the face of the component 2 as shown in FIG. 3 will, when assembled, clamp the vehicle roof panel, around the aperture, against the flange portion 1a of the component 1. The frame component 2 is suitably assembled from several parts 5a, 5b and 5c connected together by means of pins 6 or other suitable means such as sliders or knuckle joints, to form a somewhat rigid but nonetheless distortable component. The parts 5a may themselves each be formed of three separate parts, as is apparent from FIG. 4, but fewer or more such parts could be used without detriment.

The parts 5a, arranged generally along the length of the component 2, are provided with a series of inwardly-extending, integrally formed, teeth 7 (see also FIG. 8) which is used are received within and bear against the channelled perimeter 1b of the metal component 1. The tips of the teeth 7 are obliquely cut away, at their upper and inward edges, as shown in FIG. 8, to assist in clamping the panel against the frame component 1. Such teeth give less friction and economize on material. Also, the mounted portions are less bulky and thus less likely to distort after moulding.

The parts 5c of the frame component 2 house the mechanisms 4 for tightening the frame components 1 and 2 together. The parts 5b serve to connect the parts 5a and 5c together. It will be appreciated, however, that the frame component 2 could be made of more or fewer parts than illustrated, and could even comprise a single integral member.

The cable 3 extends in a restraining groove around the entire periphery of the plastics component 2 and follows a path as shown in FIGS. 4 and 5, i.e. from both sides of the tightening mechanism 4 at one end of the component 2 to the respective sides of the tightening mechanism 4 at the other end of the component 2. It follows a path which is closer to the component 1 at the corners than at the midpoints.

The cable tightening mechanism 4 is shown in detail in FIGS. 6 and 7. As shown, the mechanism 4 comprises a worm gear 8 which is in use operated for instance by an Allen key A to drive a worm gear 9 fixedly mounted on a shaft 10. The shaft 10 is provided at its end portions with screw threads 11 which engage with corresponding screw threads 12 formed in respective metal housings 13, which housings 13 are in turn connected to the ends of the cable 3. Thus by rotating the worm gear 8 by means of the Allen key A the two ends of the cable 3 as shown in FIG. 6 may be brought towards each other, thus tightening the cable and hence tightening the assembled components 1 and 2 together. This is of course only one of many mechanisms which may be used.

The central part of the mechanism 4 is housed between an upper cover plate 14 and a lower cover plate 15, the upper plate 14 being removed in FIG. 6 so as to more clearly illustrate the mechanism 4. The two plates 14 and 15 are secured together by screws engaging screw holes 16 shown in FIG. 6. FIG. 6 also shows locating pins 17 provided on the lower plate 15 for engaging corresponding blind holes in the upper plate 14.

In use, the sun roof frame described above is assembled together and fitted into a vehicle roof as follows. After cutting a suitably sized opening in the vehicle roof for receiving the sun roof, the component 1 is inserted into the opening from above, with the flange portion 1a overlying the upper, outside, perimeter of the aperture cut in the vehicle roof. The component 2, with the cable 3 disposed around the periphery thereof being in a relatively non-tightened state, is then inserted into the opening formed in the vehicle roof from below, i.e. from within the vehicle itself, and is generally received within the channelled perimeter 1b of the component 1, i.e. the component 2 is fitted peripherally around the component 1. Because of the slight resilience of the component 2 and also because of the flexibility thereof afforded by its being constructed of several parts 5a,5b,5c, it may be loosely fitted around the portion 1b of the component 1. Then, by operating the tightening mechanisms 4 by means of an Allen key as previously described, the cable 3 may be tightened so as to firmly clamp the components 1 and 2 together and grip the edges of the aperture. Since moreover the cable tries to occupy its shortest possible path under tension it will distort and bow the frame in an attempt to straighten the cable groove. This distortion is calculated to be such as to match the vehicle roof curvature. The remainder of the sun roof may the be attached to the frame in a conventional manner.

Thus, the path of the cable 3 around the periphery of the component 2 as shown in FIGS. 4 and 5 whereby, along each longitudinal side of the component 2, the cable 3 lies along a path commencing adjacent the upper face of the component 2 at one longitudinal end thereof, passes to adjacent the lower face of the component 2 at the central portion thereof, and then again passes to adjacent the upper face of the component 2 at the other longitudinal end thereof, is a particularly valuable feature of the invention.

Of course, it is also within the scope of the invention if the component is slightly bowed prior to cable-tensioning, so as to obviate all or some of the bowing which would otherwise take place on tensioning of the cable.

The clamping together of the components 1 and 2 is still further assisted by the shape of the teeth 7, as shown in FIG. 8.

Upon the clamping together of the sun roof frame components 1 and 2 by means of the cable 3, the tensioning of tightening of the cable brings the two components firmly together both vertically and laterally.

The ease and convenience of such a connection is considerable. For instance, a frame surround with say 20 screw fixings, each with about one quarter of a ton resistance to dislodgement, can be replaced by a fitting according to the invention, with the cable stressed to 20 tons but exerting about five tons total closing force as before.

Thus, it will be apparent that the sun roof frame described above may be easily, firmly and reliably assembled together, in a manner which is considerably facilitated as compared with the previously known manner of assembly of sun roof frames.

While the invention has been particularly described above in connection with the assembly of the components of a vehicle sun roof frame, it will be appreciated that the invention may find use in other applications where two frame components are to be assembled together. The invention is therefore to be understood as relating to any assembly of two frame components, a cable or the like extending around the periphery of one of the components, and means for tightening the cable so as to secure the two frame components together at the peripheries thereof.

While a preferred embodiment of the invention has been described herein, it is to be understood that it may be embodied within the scope of the appended claims.

I claim:

1. A frame adapted to grip the edges of and thereby fixedly surround an aperture in a panel, said frame comprising:
   a first frame component adapted to be located around the aperture on one surface of the panel, said first frame component having a top face adapted to overlie the one surface of the panel and an inclined inner face extending from said top face and adapted to be located within the aperture;
   an inwardly deformable second frame component adapted to be located around the aperture of the other surface of the panel, said second frame component having an edge face with an incline similar to said inclined inner face on said first frame component and being positively curved at all points around its periphery;
   a tensioning means around said edge face of said second frame component; and
   means for tightening said tensioning means so as to deform said second frame component;
   said first and second frame components being complementarily formed so that upon tensioning and deformation of said second frame component said edge face on said second frame component rides up said inclined inner face on said first frame component to clamp said frame components together within the aperture and to grip the edge of the panel around the aperture.

2. A frame as set forth in claim 1 wherein said second frame component has a shape generally resembling a rectangle with radiused corners and outwardly bowed edges.

3. A frame as set forth in claim 1 wherein said edge face of said second frame component has a restraining groove formed therein and said tensioning means is a cable held against undesired lateral slipage in said restraining groove.

4. A frame as set forth in claim 3 wherein said tightening means are high mechanical advantage wind-up means.

5. A frame as set forth in claim 3 wherein said restraining groove formed in the edge face of said second frame component is located in a plurality of planes, whereby tightening of said tensioning means distorts the assembled frame as the cable attempts to occupy the shortest path in a single plane.

6. A frame as set forth in claim 5 wherein the path of said restraining groove on said edge face of said second frame component is nearer to said first frame component at the radiused corners than at the middle of the bowed sides of a generally rectangular frame.

7. A frame as set forth in claim 1 wherein said first frame component is the outer component and is made of metal, and said second frame component is the inner component and is made of polymer material.

8. A frame as set forth in claim 7 wherein said polymeric second frame component is formed by a number of subunits located in end to end relation to each other.

9. A frame as set forth in claim 7 wherein said polymeric second frame component is toothed or serrated or similarly segmented.

* * * * *